June 30, 1942.   R. GUNN   2,287,794
APPARATUS FOR MEASURING MECHANICAL POWER
Filed Aug. 14, 1939   2 Sheets-Sheet 2
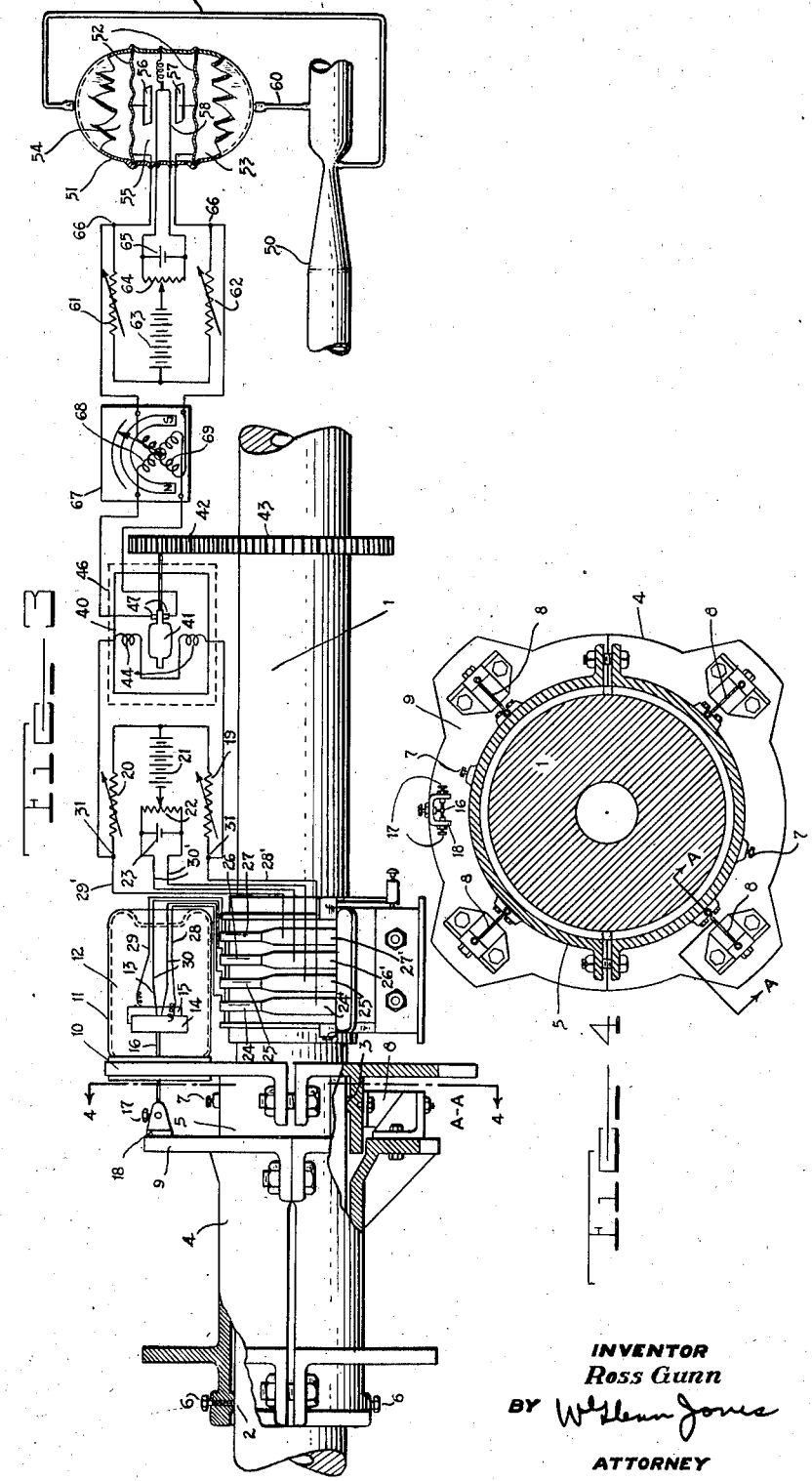
INVENTOR
*Ross Gunn*
BY *W. Glenn Jones*
ATTORNEY Patented June 30, 1942

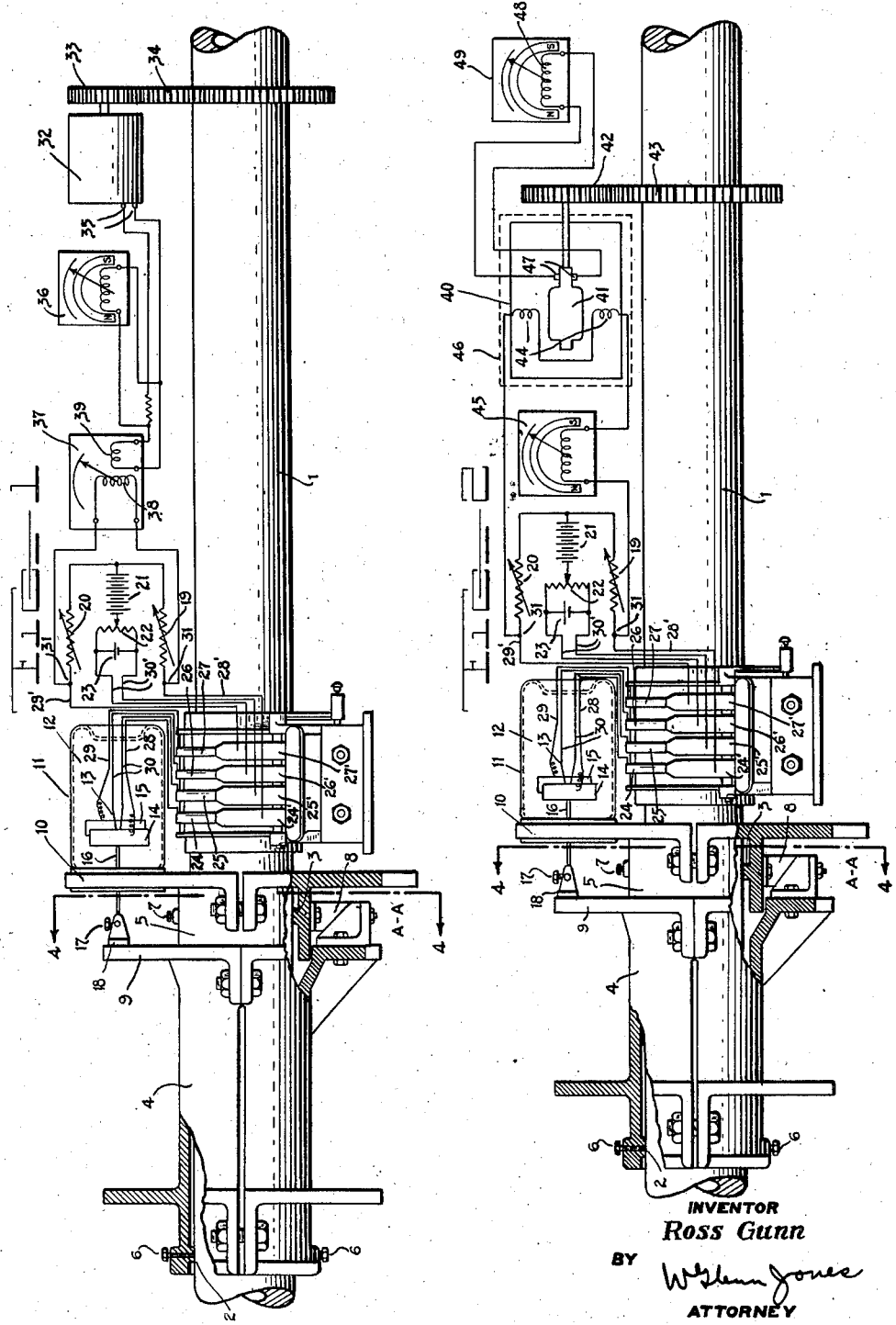

2,287,794

UNITED STATES PATENT OFFICE 2,287,794

APPARATUS FOR MEASURING MECHANICAL POWER

Ross Gunn, Washington, D. C.

Application August 14, 1939, Serial No. 290,043

12 Claims. (Cl. 265—25)

(Granted under the act of March 3, 1883, as amended April 30, 1928; 370 O. G. 757)

My invention relates to an apparatus for measuring mechanical power and more particularly to an apparatus for measuring the mechanical power transmitted by a rotating shaft or the ratio of such transmitted power to the rate of flow of the fluid medium supplying the necessary driving energy.

One of the currently employed methods of determining transmitted shaft power consists in taking separate measurements of the torsional deflection of the shaft together with the rotative speed of the same, which measured quantities by subsequent calculations give the mechanical power transmitted. While a variety of electromechanical instrumentalities have been devised for giving a continuous and direct reading of the transmitted shaft power to thereby obviate the many disadvantages and tedium of the above method, their use has been necessarily restricted principally because of their inherent complexity.

With a view to remedying the prior art deficiencies, I have devised an apparatus of the stated character that gives a direct and continuous reading of the desired quantity and which is relatively simple and durable in structure. In carrying my invention into effect, I utilize, in combination with a power shaft, a space discharge device comprising an envelope enclosing at least three electrodes, at least one of which is electron emissive and at least one of which is movable with respect to the envelope. The envelope of the space discharge device and at least the movable electrode thereof are secured to the shaft at spaced points therealong in such a manner as to cause an increase in resistance between a plurality of the electrodes simultaneously with a decrease in a like resistance upon subjecting the shaft to a torsional deflection. The magnitude of this simultaneous variation in the interelectrode resistances is, therefore, directly proportional to the torque being transmitted by the shaft.

The space discharge device is connected in a bridge circuit to form two branches thereof, which circuit is normally in a state of balance when no power is being transmitted by the shaft. A generator, the voltage output of which is proportional to at least the speed of the shaft, is driven by the shaft at a speed equal to or proportional to that of the shaft. For directly and continuously indicating a quantity that is proportional to both the torque and speed of the shaft, an electrical instrument is provided which is controlled by the generator and the differential voltage generated across a diagonal of the bridge circuit consequent upon any unbalancing thereof.

Where it is desired to measure the ratio of the transmitted shaft power to the rate of flow of the fluid medium supplying the necessary driving energy, there is employed in addition to the foregoing apparatus an instrumentality for generating a voltage proportional to the rate of flow of the fluid medium. By the utilization of an electrical instrument for indicating the ratio of two electrical quantities, the desired ratio may be directly and continuously indicated by associating the same with the apparatus and the aforesaid instrumentality all in a suitable manner.

In the light of the foregoing, it is among the several objects of my invention to provide an electromechanical apparatus that is relatively simple and durable in structure for affording a direct and continuous reading of transmitted shaft power or the ratio of such power to the rate of flow of the fluid medium supplying the necessary driving energy; and to provide an apparatus of the stated character in which a space discharge device is employed that is directly responsive to the torque being transmitted by the shaft.

Other objects and many of the attendant advantages of this invention will be readily appreciated as the same becomes better understood by reference to the following detailed description when considered in connection with the accompanying sheets of drawings wherein:

Fig. 1 discloses one embodiment of my invention for measuring transmitted shaft power in which the electrical instrument for providing a direct and continuous reading of the desired quantity is connected across a diagonal of the bridge circuit and to the output terminals of the generator;

Fig. 2 depicts another embodiment of the present invention for measuring transmitted shaft power in which the field coil of the generator is connected across a diagonal of the bridge circuit and the electrical instrument for providing a direct and continuous reading of the desired quantity is connected to the output terminals of the generator;

Fig. 3 discloses an embodiment of the invention for measuring the ratio of the transmitted shaft power to the rate of flow of the fluid medium supplying the necessary driving energy; and Fig. 4 is an enlarged sectional view taken on the line 4—4 of each of the figures showing in greater detail the manner of maintaining a concentric relationship between the shaft encircling sleeves that engage the space discharge device.

Before proceeding to a detailed description of the various embodiments of my invention, it is desired to make certain general remarks regarding the space discharge device employed therein so as to avoid needless repetition in the subsequent parts of the description. As noted hereinbefore, each space discharge device comprises an envelope enclosing at least three electrodes, at least one of which is electron emissive to thus serve as the cathode and at least one of which is movable with respect to the envelope.

A cursory examination of the drawings will show that all cathodes have been depicted therein as of the thermionic type, the heating thereof to insure electron emission being accomplished directly by a suitable source of electromotive force. I wish to emphasize in this connection, however, that I do not desire to be restricted to this type of cathode since cathodes which emit electrons due to bombardment by rapidly moving ions, electrons, or metastable atoms and are said to be secondarily emissive, or photoelectric cathodes, or cold or non-thermionic cathodes which spontaneously emit electrons due to treatment thereoby a radioactive substance, all will serve the purpose of my invention equally well. As for the thermionic cathode, it may be fabricated of a pure metal, be oxide-coated, be of a metal provided with an adsorbed monatomic film of one of the electro-positive metals or be of any other type known to the art.

The envelopes of my space discharge devices which are fashioned from any of the materials known to the prior art and serve to enclose the electrodes may be evacuated to produce a high vacuum and thus insure a substantially pure electron discharge or may alternatively be provided with a suitable filling of a gas or vapor, gases or vapors, or mixtures of gases and vapors at a selected pressure or pressures to insure the desired operating characteristics.

It will be further noted from an examination of the drawings that the space discharge device is shown in each instance as incorporating two movable anodes and a stationary cathode, the anodes of which are conjointly movable with respect to the envelope and the cathode in response to any torsional deflection of the shaft. The electrode arrangement employable in the present invention, however, is not to be understood as being restricted to the foregoing structure. It is only necessary that the envelope enclose at least three electrodes, at least one of which is movable with respect to the envelope so that movement of at least the movable electrode will cause an increase in resistance between a plurality of electrodes simultaneously with a decrease in a like resistance. Any number of tube structures will satisfy the foregoing essential requirements and will readily suggest themselves to those skilled in the art.

Turning now to the several figures of the drawings, there is shown depicted therein a rotatable shaft 1 having securely clamped thereto at spaced points 2 and 3 the sectionalized sleeves 4 and 5, one of which exceeds the other in length. The set screws 6 and 7 are employed at the respective points of securement of sleeves 4 and 5 to the shaft to make certain that no peripheral or longitudinal movement of the sleeves relative to the shaft will occur. The free end of the sleeve 4 is supported from and maintained concentric with the sleeve 5 by means of the tension members 8 constructed as thin flexible plates which offer no appreciable obstruction to rotational movement between the sleeves. These tension members are secured to the terminal portions of the sleeves in any suitable manner. It is thus evident that any angular or torsional deflection of the shaft intermediate the points of securement of the sleeves thereto upon the application of any torque will be transmitted to the flanges 9 and 10 of the respective sleeves 4 and 5 and cause them to be displaced relative to each other by the same amount.

A space discharge device identified in general by the reference character 11 is shown, by way of example, as comprising an envelope 12 enclosing a thermionic cathode 13 stationarily mounted with respect to the envelope and interposed between a pair of conjointly movable anodes 14 and 15, the three electrodes being mounted for simultaneous cooperation and being disposed to cause an increase in one anode-cathode resistance simultaneously with a decrease in a like resistance. The two anodes 14 and 15 are rigidly secured to the elongated member or arm 16 and are electrically insulated from each other and from the arm in any suitable manner. The arm, as shown, extends from the envelope interior to a point exteriorly thereof and at its point of emergence is flexibly and hermetically sealed to the envelope by the employment of any of the well-understood expedients known to the prior art.

The envelope 12 of the space discharge device is suitably mounted on the flange 10 of the sleeve 5, while the deflector arm 16 adjacent its outer extremity is laterally engaged by a series of set screws 17 (Fig. 4) supported by a bracket 18 secured to the flange 9 of the sleeve 4. Thus, it should be clear that any relative movement of the flanges 9 and 10 attending any angular or torsional deflection of the shaft will cause simultaneously a decrease in spacing between the first anode and the cathode and an increase in spacing between the second anode and cathode, the variation in spacing being directly proportional to the torque under transmission. In consequence of the foregoing, there will be produced an increase in one inter-electrode ohmic resistance simultaneously with a decrease in a like resistance.

The space discharge device 11 is connected in a bridge circuit to form two branches thereof, the remaining two branches of which are formed by the balancing resistances 19 and 20. It is thus seen that the bridge circuit includes four arms or branches, two of which are constituted by the ohmic resistances between the anode 14, cathode 13 and anode 15, cathode 13, with the resistances 19 and 20 heretofore mentioned forming the remaining two branches. Any suitable source of electromotive force 21 is connected across one diagonal of the bridge circuit for energizing the same and has one terminal slidably engaging a resistance 22 in shunt with the source of electromotive force 23 which serves to heat the cathode 13 of the space discharge device to an electron emissive temperature. The resistance shunting the source of electromotive force 23 provides additional means for balancing the bridge circuit.

Since in the embodiments of my invention shown in the several figures of the drawings only the space discharge device 11 is secured to and rotates with the shaft 1, provision must be made for electrically connecting the same with the sources of electromotive force 21 and 23 and the balancing resistances 19 and 20, which constitute two branches of the bridge circuit. To this end, slip rings 24, 25, 26 and 27 are insulatingly mounted from each other and from the shaft to rotate with the latter and cooperate respectively with brushes 24', 25', 26', and 27'. By means of this arrangement, a continuous electrical connection is provided between anodes 14 and 15 and the respective balancing resistances 19 and 20 through conductors 28 and 29 interconnecting anodes 14 and 15 with slip rings 24 and 27, and conductors 28' and 29' interconnecting the brushes 24' and 27' with the terminal portions of the balancing resistances 19 and 20. The thermionic cathode 13 is maintained in continuous electrical connection with respect to the source of electromotive force 23 by means of the conductors 30 interconnecting the electrode and the slip rings 25 and 26 and the conductors 30' interconnecting the brushes 25' and 26' with the source of electromotive force 23. From the foregoing, it should be clear that if the bridge circuit is initially balanced prior to the transmission of any power by the shaft that any differential voltage subsequently developed in the diagonal 31—31 of the bridge circuit will be directly proportional to the transmitted torque.

Referring now to Fig. 1 of the drawings, it will be observed that a direct current generator 32, the voltage output of which is proportional to the shaft speed, is driven by the shaft 1 through a pinion 33 securely mounted on the generator armature and in meshing engagement with the gear 34 rigidly secured to the shaft in question. Thus, the electromotive force developed at the generator terminals 35 is directly proportional to the speed of the rotating shaft, which latter quantity may, if desired, be directly indicated by the standard type of voltmeter 36 calibrated in units of speed.

An electrical instrument 37 of the conventional dynamometer type may be conveniently employed for directly and continuously indicating the power being transmitted by the shaft. As is well known, such an instrument consists essentially of a moving coil 38 to which is secured a pointer for cooperation with a scale arranged for movement in a magnetic field produced by a second fixed independent coil 39. The movable coil 38 of this instrument is connected across the diagonal 31—31 of the bridge circuit while the fixed coil 39 is connected directly to the output terminals 35 of the generator. By virtue of the foregoing connections, it should be clear that the current in the coil 38 is proportional to the torque being transmitted by the shaft while the current in the coil 39 is proportional to the speed of the same. It thus follows that the instrument 37 will indicate a quantity that is proportional to the product of the torque and speed of the shaft and hence may be employed to measure the power being transmitted. Any convenient unit of power may be used in calibrating the instrument.

In use the bridge of the apparatus is first balanced prior to any measuring operation. Thus, with no torque applied to the shaft, the balancing resistances 19 and 20 are manipulated in such a fashion that no differential voltage is developed across the diagonal 31—31 of the bridge circuit. Any convenient instrument may be employed for determining when the bridge is balanced. The foregoing initial adjustments having been carefully executed, the apparatus is now in condition for measuring the power transmitted by the shaft, all in a manner carefully detailed hereinbefore.

Referring again to Figs. 2 and 3 of the drawings, there is shown diagrammatically depicted therein a direct current generator, identified in general by the reference character 40. The generator includes an armature 41 driven by the shaft 1 through the pinion 42 mounted on the armature shaft and in meshing engagement with the gear 43 rigidly secured to the shaft in question. The field winding of the generator comprises two coils 44 connected across the diagonal 31—31 of the bridge circuit and in series with a suitably calibrated current meter 45, if desired, for indicating the torque transmitted by the shaft. The generator is carefully shielded from external magnetic fields by a shield 46 fabricated of any suitable material, such as soft iron or permalloy. Furthermore, the magnetic circuit associated with the coils 44 of the field winding is arranged to be very nearly hysteresis free either by the use of air cores or by the use of suitable low hysteresis material, such as iron-nickel alloys.

From the foregoing it should be evident that, if the bridge circuit is initially balanced prior to any measuring operation, any differential voltage subsequently developed in the diagonal 31—31 of the bridge circuit will be directly proportional to the transmitted torque and that in consequence thereof the current flowing through the coils 44 of the field winding and their accompanying electromagnetic fields will likewise be proportional to the torque under transmission. Hence, the voltage appearing across the brushes 47 of the generator 40 will be proportional to the product of the torque and speed of the shaft and hence proportional to the power being transmitted by the same.

If, now, as shown in Fig. 2 of the drawings, the brushes 47 of the generator are connected to the coil 48 of a voltmeter type of instrument 49, the latter will indicate a quantity that is proportional to the product of the torque and speed of the shaft. By a suitable calibration, the instrument can be made to indicate directly and continuously the transmitted power in any convenient unit.

As in the embodiment depicted in Fig. 1 of the drawings, it is only essential that the bridge circuit in the apparatus of Fig. 2 be balanced prior to any measuring operation, this being accomplished as noted hereinbefore and being capable of detection by observation of the reading of the current instrument 45. In the absence of the transmission of any power, a balancing of the bridge circuit will be indicated by a zero deflection of the current meter 45 connected across the diagonal 31—31 of the circuit.

The embodiment in Fig. 3 of the drawings is intended for measuring the ratio of the transmitted shaft power to the rate of flow of the fluid medium supplying the necessary driving energy. While any convenient means may be employed for generating a voltage proportional to the rate of flow of the fluid medium, I have here shown by way of example a convenient type of flow meter associated with a space discharge device, which in turn is connected to form two branches of a bridge circuit identical in all respects with that heretofore described.

A conventional Venturi tube, identified by the reference character 50, serves to pass the fluid medium, which in turn supplies the energy necessary for driving the shaft. The medium traversing the Venturi tube may be any suitable fuel which by a subsequent energy conversion supplies the necessary motive fluid for driving the shaft or it may be the motive fluid for direct application to the prime mover. A space discharge device controllable by fluid pressure comprises a vessel 51 across which there extends a plurality of flexible metallic partitions 52 to form therewith end chambers 53, 54 and an intermediate chamber 55. Anodes 56 and 57 are supported by their respective flexible partitions for movement within the intermediate chamber and have interposed therebetween a thermionic cathode 58. A conduit 59 connects the Venturi tube 50 at the constriction thereof to the end chamber 54 while a conduit 60 places the end chamber 53 in communication with the Venturi tube at a point spaced from the constriction.

By means of this arrangement, any differential pressure created at the points in the Venturi tube where the conduits 59 and 60 communicate with the same is transmitted to the end chambers 53 and 54 of the space discharge device, thus causing the spacing between the first anode and the cathode to decrease simultaneously with an increase in the spacing between the second anode and cathode. This variation in spacing causes an increase in an anode cathode resistance simultaneously with a decrease in a like resistance, the magnitude of the change in resistance being directly proportional to the rate of flow of the fluid medium in the Venturi tube.

The space discharge device, controllable by the fluid pressure, is connected in a bridge circuit to form two branches thereof, the remaining two branches being constituted by the variable balancing resistances 61 and 62. Any suitable source of electromotive force 63 serves to energize the bridge circuit and has one terminal thereof slidably engaging a resistance 64 in shunt with a suitable source of electromotive force 65 for heating the cathode 58 to electron emissive temperature. If, therefore, the bridge circuit is initially balanced prior to the flow of any fluid medium through the Venturi tube, any subsequent differential voltage developed across the diagonal 66—66 of the bridge circuit will be directly proportional to the rate of flow of the fluid medium supplying the energy necessary for driving the shaft.

An electrical instrument for indicating the ratio of two quantities one of which is proportional to both the torque and speed of the shaft and the remaining one of which is proportional to the rate of flow of the fluid medium is identified in general by the reference character 67. Such an instrument may be one wherein two coils, such as 68 and 69, are mounted at right angles with respect to each other for movement with a pointer about an axis in a magnetic field provided by a permanent magnet or electromagnet. The coil 69 of the instrument is shown as connected across the diagonal 66—66 of the bridge circuit associated with the space discharge device controllable by fluid pressure, while the coil 68 is connected to the brushes 47 of the generator.

If, now, both bridge circuits of the apparatus are initially balanced prior to any measuring operation, it is evident that the currents flowing in the coils 68 and 69 of the instrument 67 will be proportional respectively to the power being transmitted by the shaft and the rate of flow of the fluid medium supplying the necessary driving energy. Hence, the instrument will indicate the ratio of two quantities, one of which is proportional to both the torque and speed of the shaft and the remaining one of which is proportional to the rate of flow of the fluid medium through the Venturi tube. The instrument 67 may of course be calibrated in any convenient units giving a direct and continuous reading of the ratio of the power transmitted to the rate of flow of the medium supplying the necessary driving energy. It is evident that in a power installation operating in the most efficient manner, the ratio indicated by the instrument 67 will be a maximum. Hence, an operator, by observing the instrument 67, may adjust the operating conditions of the power installation until the meter reads a maximum. Under these circumstances, the power plant will be operating at its maximum efficiency.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. In combination with a power shaft, a space discharge device comprising an envelope enclosing at least three electrodes, at least one of which is electron emissive and at least one of which is movable with respect to the envelope, means for securing said envelope and at least the movable electrode to said shaft at spaced points therealong to thereby cause an increase in resistance between a plurality of electrodes simultaneously with a decrease in a like resistance upon subjecting the shaft to torsion, a bridge circuit in which the space discharge device is connected to form two branches thereof, a generator driven by said shaft and means controlled by said bridge circuit and generator for indicating a quantity that is proportional to both the torque and speed of the shaft.

2. In combination with a power shaft, a space discharge device comprising an envelope enclosing at least three electrodes, at least one of which is electron emissive and at least one of which is movable with respect to the envelope, means for securing said envelope and at least the movable electrode to said shaft at spaced points therealong to thereby cause an increase in resistance between a plurality of electrodes simultaneously with a decrease in a like resistance upon subjecting the shaft to torsion, a bridge circuit in which the space discharge device is connected to form two branches thereof, a generator driven by said shaft and an instrument for indicating a quantity that is proportional to both the torque and speed of the shaft, the said instrument being connected across a diagonal of the bridge circuit and to the output terminals of the generator.

3. In combination with a power shaft, a space discharge device comprising an envelope enclosing at least three electrodes, at least one of which is electron emissive and at least one of which is movable with respect to the envelope, means for securing said envelope and at least the movable electrode to said shaft at spaced points therealong to thereby cause an increase in resistance between a plurality of electrodes simultaneously with a decrease in a like resistance upon subjecting the shaft to torsion, a bridge circuit in which the space discharge device is connected to form two branches thereof, a generator including an armature driven by said shaft and a field winding connected across a diagonal of the bridge circuit and an instrument connected to the output terminals of the generator for indicating a quantity that is proportional to both the torque and speed of the shaft.

4. In combination with a power shaft, a space discharge device comprising an envelope enclosing at least three electrodes, at least one of which is electron emissive and at least one of which is movable with respect to the envelope, means for securing said envelope and at least the movable electrode to said shaft at spaced points therealong to thereby cause an increase in resistance between a plurality of electrodes simultaneously with a decrease in a like resistance upon subjecting the shaft to torsion, a bridge circuit in which the space discharge device is connected to form two branches thereof, a generator including an armature driven by said shaft and a field winding connected across a diagonal of the bridge circuit, a Venturi tube through which a fluid medium flows for supplying the energy necessary for driving the shaft, a space discharge device controllable by fluid pressure comprising a vessel, a plurality of flexible partitions extending across said vessel to form therewith end chambers and an intermediate chamber, an anode supported by each of said flexible partitions for movement within said intermediate chamber and a cathode interposed between said anodes, conduits for connecting said Venturi tube at the constriction thereof and at a point spaced therefrom to the respective end chambers of the space discharge device, a second bridge circuit in which the second mentioned space discharge device is connected to form two branches thereof, and an instrument for indicating the ratio of two quantities, one of which is proportional to both the torque and speed of the shaft and the remaining one of which is proportional to the rate of flow of the fluid medium through the Venturi tube, the said instrument being connected across a diagonal of the second mentioned bridge circuit and to the output terminals of the generator.

5. In combination with a power shaft, a space discharge device comprising an envelope enclosing at least three electrodes, at least one of which is electron emissive and at least one of which is movable with respect to the envelope, means for securing said envelope and at least the movable electrode to said shaft at spaced points therealong to thereby cause an increase in resistance between a plurality of electrodes simultaneously with a decrease in a like resistance upon subjecting the shaft to torsion, a bridge circuit in which the space discharge device is connected to form two branches thereof, a generator including an armature driven by said shaft and a field winding connected across a diagonal of the bridge circuit, a flow meter through which passes the fluid medium for supplying the energy necessary for driving the shaft, a second space discharge device comprising an envelope enclosing at least three electrodes, at least one of which is electron emissive and at least one of which is movable, means interconnecting said flow meter and said second mentioned space discharge device for causing an increase in resistance between a plurality of the electrodes thereof simultaneously with a decrease in a like resistance upon the flow of a fluid medium through the meter, a second bridge circuit in which the second mentioned space discharge device is connected to form two branches thereof, and an instrument for indicating the ratio of two quantities one of which is proportional to both the torque and speed of the shaft and the remaining one of which is proportional to the rate of flow of the fluid medium through said meter, the said instrument being connected across a diagonal of the second mentioned bridge circuit and to the output terminals of the generator.

6. In combination with a power shaft, a space discharge device comprising an envelope enclosing at least three electrodes, at least one of which is electron emissive and at least one of which is movable with respect to the envelope, means for securing said envelope and at least the movable electrode to said shaft at spaced points therealong to thereby cause an increase in resistance between a plurality of electrodes simultaneously with a decrease in a like resistance upon subjecting the shaft to torsion, a bridge circuit in which the space discharge device is connected to form two branches thereof, a generator including an armature driven by said shaft and a field winding connected across a diagonal of the bridge circuit, means for generating a voltage proportional to the rate of flow of the fluid medium supplying the energy necessary for driving the shaft, and an instrument for indicating the ratio of two quantities one of which is proportional to both the torque and speed of the shaft and the remaining one of which is proportional to the rate of flow of the fluid medium, the said instrument being connected to said second mentioned means and to the output terminals of the generator.

7. In combination with a power shaft, means for generating voltages that are proportional to both the torque and speed of the shaft and an electrical instrument connected in circuit with the aforesaid means for indicating a quantity that is proportional to the product of the torque and speed of the shaft, the said means including a space discharge device comprising an envelope enclosing at least three electrodes, at least one of which is movable and at least one of which is electron emissive.

8. In combination with a power shaft, means for generating voltages that are proportional to both the torque and speed of the shaft and an electrical instrument connected in circuit with the aforesaid means for indicating a quantity that is proportional to the product of the torque and speed of the shaft, the said means including a space discharge device comprising an envelope enclosing at least three electrodes, at least one of which is movable and at least one of which is electron emissive, the said envelope and at least the movable electrode being secured to the shaft at spaced points therealong to cause an increase in resistance between a plurality of electrodes simultaneously with a decrease in a like resistance upon subjecting the shaft to torsion.

9. In combination with a power shaft, means for generating voltages that are proportional to both the torque and speed of the shaft and an electrical instrument connected in circuit with the aforesaid means for indicating a quantity that is proportional to the product of the torque and speed of the shaft, the said means including a space discharge device comprising an envelope enclosing a plurality of conjointly movable anodes and an interposed cathode, the said envelope and the movable anodes being secured to the shaft at spaced points therealong to cause an increase in one anode-cathode resistance simultaneously with a decrease in a like resistance upon subjecting the shaft to torsion.

10. In combination with a power shaft, means for generating a voltage proportional to the power being transmitted by the shaft, the said means including a space discharge device having at least three electrodes with its envelope and a movable electrode thereof secured to the shaft at spaced points therealong to be responsive to any torsional deflection of the shaft, a second means for generating a voltage proportional to the rate of flow of the fluid medium supplying the energy necessary for driving the shaft and an electrical instrument for indicating the ratio of two quantities, said instrument being connected in circuit with both of the aforesaid means.

11. In combination with a power shaft, means for generating a voltage proportional to the power being transmitted by the shaft, the said means including a generator with its armature driven by the shaft and its field winding energizable by a current proportional to the torque under transmission, a second means for generating a voltage proportional to the rate of flow of the fluid medium supplying the energy necessary for driving the shaft and an electrical instrument for indicating the ratio of two quantities, said instrument being connected in circuit with both of the aforesaid means.

12. In combination with a power shaft, means for generating a voltage proportional to the power being transmitted by the shaft, the said means including a normally balanced bridge circuit adjustable to a position of unbalance by the shaft in proportion to the torque under transmission, a second means for generating a voltage proportional to the rate of flow of the fluid medium supplying the energy necessary for driving the shaft and an electrical instrument for indicating the ratio of two quantities, said instrument being connected in circuit with both of the aforesaid means.

ROSS GUNN.